(12) United States Patent
Okuno

(10) Patent No.: US 7,655,483 B2
(45) Date of Patent: Feb. 2, 2010

(54) ELECTRONIC DEVICE AND MANUFACTURING METHOD THEREOF

(75) Inventor: Yasutoshi Okuno, Kyoto (JP)

(73) Assignee: Panasonic Corporation, Osaka (JP)

( * ) Notice: Subject to any disclaimer, the term of this patent is extended or adjusted under 35 U.S.C. 154(b) by 4 days.

(21) Appl. No.: 12/201,537

(22) Filed: Aug. 29, 2008

(65) Prior Publication Data
US 2009/0011596 A1 Jan. 8, 2009

Related U.S. Application Data

(62) Division of application No. 11/225,341, filed on Sep. 14, 2005, now abandoned.

(30) Foreign Application Priority Data
Dec. 17, 2004 (JP) ............................... 2004-366519

(51) Int. Cl.
*H01L 21/66* (2006.01)
(52) U.S. Cl. .............................. 438/17; 438/10; 438/14; 438/682
(58) Field of Classification Search ................... 438/10, 438/11, 14, 17, 18, 649, 651, 655, 682, 683
See application file for complete search history.

(56) References Cited

U.S. PATENT DOCUMENTS

| | | | | |
|---|---|---|---|---|
| 5,617,364 A | * | 4/1997 | Hatakeyama | ................ 365/200 |
| 6,161,213 A | * | 12/2000 | Lofstrom | ............. 257/E23.179 |
| 6,289,292 B1 | * | 9/2001 | Charlton et al. | ............. 702/108 |
| 6,622,102 B2 | * | 9/2003 | Skidmore | ..................... 702/84 |
| 6,657,243 B2 | | 12/2003 | Kumagai et al. | |
| 7,282,377 B2 | * | 10/2007 | Muranaka | ..................... 438/18 |

FOREIGN PATENT DOCUMENTS

WO    WO 02/45139 A1    6/2002

OTHER PUBLICATIONS

Kedziersky, Jakub., et al. "Threshold voltage control in NiSi-gated MOSFETs through silicidation induced impurity segregation (SIIS)." International Electron Devices Meeting 2003m Technical Digest, pp. 1-4.

* cited by examiner

*Primary Examiner*—Kevin M Picardat
(74) *Attorney, Agent, or Firm*—McDermott Will & Emery LLP

(57) ABSTRACT

An electronic device includes an element group which generates a specific identification number and is composed of a plurality of elements. The specific identification number is set based on irregular deviation in electric characteristic of the elements which is caused due to a random failure in a manufacturing process.

15 Claims, 11 Drawing Sheets

ELECTRONIC DEVICE AND MANUFACTURING METHOD THEREOF

CROSS REFERENCE TO RELATED APPLICATIONS

This application is a Divisional of U.S. application Ser. No. 11/225,341, filed Sep. 14, 2005, now abandoned claims priority under 35 U.S.C. §119(a) on Patent Application No. 2004-366519 filed in Japan on Dec. 17, 2004, the entire contents of which are hereby incorporated by reference.

BACKGROUND ART

The present invention relates to a technology for providing means for assigning a specific identification number to an electronic device.

Assignment of a specific number to an electronic device itself such as a semiconductor chip and the like has been examined in view of manufacturing process management (to record information on when it is manufactured, which wafer or chip it is, and the like). Recently, taking application to IC money, IC tags, ID cards, and the like into consideration, it has been recognized that assignment of a specific number unchangeable from outside to a chip itself is an important key and essential to problem solution. In other words, it is important to provide an artificially unforgeable semiconductor chip. Also, such a method for assigning a specific number to a chip or the like which is simple as far as possible is desired in view of cost reduction.

Under the circumstances, a conventional method has been employed in which a fuse element or a programmable element such as an EEPROM (electrically erasable programmable read-only memory) is provided in a semiconductor chip composing a semiconductor integrated circuit and specific identification information is assigned to the programmable element.

Other novel methods have been proposed such as a method that utilizes a flip flop rise pattern formed due to ununiformity in transistor characteristic which is yield by process variation (see, for example, International Publication No. 02/45139). In detail, a plurality of identification elements having the same aspect are formed in the course of a manufacturing process of a semiconductor integrated circuit device and identification information specific to the semiconductor integrated circuit device or a semiconductor chip is set based on a magnitude relationship in physical quantity of the plurality of identification elements which corresponds to the process variation.

SUMMARY OF THE INVENTION

The former method in which a programmable element is provided, however, requires artificial assignment of the specific number, necessitating an additional step to the general manufacturing process or necessitating an additional step of writing the identification information after the manufacture.

Also, the latter method in which the identification information is set based on the magnitude relationship in physical quantity of the identification elements which corresponds to the process variation involves the following problems. Namely, in the method, the magnitude relationship to be identified in physical quantity offers a minute difference (on a micro scale) corresponding to standard variation in physical quantity between two adjacent elements, rather than a comparatively large difference in physical quantity which is derived from a characteristic failure. Further, it is highly probable that variation in, for example, threshold value of adjacent inverter circuit elements varies depending on environment (particularly, temperature) where the elements are situated. Therefore, it is difficult to indicate an invariable specific number with high reliability over the temperature range where a semiconductor element or the like to be the identification element is used. Further, these inverters may indicate inverse values in the presence of cosmic rays, similar to the case of SRAMs (static random access memory).

Thus, indication of numbers specific to devices with high reliability is difficult through the newly proposed method in the environment in the wide temperature range where the semiconductor element and the like to be the identification element is used actually.

In view of the above problems, the present invention has its object of assigning an identification number specific to an electronic device with high reliability without a new step added to a general manufacture process.

To attain the above object, the present inventor has contemplated utilizing, as a specific identification number of an electronic device, irregular deviation in electric characteristic which is caused due to a failure (hereinafter referred to as a random failure) of an element (for example, a semiconductor element such as resistor element and the like) which occurs accidentally at a certain probability in an electronic device manufacturing process such as a semiconductor manufacturing process. Specifically, a target element is selected first through, for example, an access transistor, and then, variation in electric characteristic of the selected element is detected by an sense amplifier. This enables setting of a specific identification number based on irregular deviation in electric characteristic of the element which is caused due to a random failure in the manufacturing process. Further, the present inventor has contemplated generating a specific identification number by utilizing, as the irregular deviation in electric characteristic of the element, irregular resistance rise that randomly occurs due to accidental disconnection of, for example, a silicided layer in a silicide wiring (a thin wiring or an active region at least a part of which is silicided) of a semiconductor element.

Specifically, an electronic device according to the present invention includes: an element group which generates a specific identification number and which is composed a plurality of elements, wherein the specific identification number is set based on irregular deviation in electric characteristic of the elements which is caused due to a random failure in a manufacturing process.

In the electronic device of the present invention, in the case where each of the elements outputs binary information as variation in electric characteristic of the element, an specific number of 2 raised to power of "an ordinal number of elements" can be generated.

In the electronic device of the present invention, if each of the elements has an access transistor, a target element of which electric characteristic is to be detected can be selected reliably.

In the case where each of the elements of the electronic device in the present invention has the access transistor, it is possible that each of the elements includes an active region which is connected to the access transistor electrically and which has a width smaller than a minimum width in a design rule, a surface of the active region is silicided to form a silicided layer, and the specific identification number is set based on irregular resistance rise by disconnection of the silicided layer in the active region.

In the case where each of the elements of the electronic device in the present invention has the access transistor, it is possible that each of the elements has a gate wiring which is connected to the access transistor electrically and which has a width smaller than a minimum width in a design rule, a surface of the gate wiring is silicided to form a silicided layer, and the specific identification number is set based on irregular resistance rise by disconnection of the silicided layer in the gate wiring.

In the case where each of the elements of the electronic device in the present invention has the access transistor, it is possible that a contact having a diameter smaller than a minimum diameter in a design rule or a contact extending over an active region of the access transistor and an isolation region surrounding the active region is formed on the active region, and the specific identification number is set based on irregular resistance rise by connection failure between the contact and the active region.

In the case where each of the elements of the electronic device in the present invention has the access transistor, it is possible that a surface of a gate electrode of the access transistor is silicided to form a silicided layer and the specific identification number is set based on irregular deviation in threshold value of the access transistor which is caused by full silicidation in the gate electrode.

In the case where each of the elements of the electronic device in the present invention has the access transistor, it is possible that the plurality of elements includes at least one first element having a first gate wiring which is connected to the access transistor of the first element electrically and which has a width equal to or larger than a minimum width in a design rule, the plurality of elements includes at least one second element having a second gate wiring which is connected to the access transistor of the second element electrically and which has a width smaller than a minimum width in a design rule, surfaces of the first gate wiring and the second gate wiring are silicided to form silicided layers, the first gate wiring composes an electric fuse that invites disconnection of the silicided layer thereof through writing from outside, the second gate wiring composes a physical fuse that invites disconnection of the silicided layer thereof which is caused due to a random failure, and the specific identification number is set based on respective states of the electrical fuse and the physical fuse.

In the case where each of the elements of the electronic device in the present invention has the access transistor, it is possible that each of the elements includes an active region which is connected to the access transistor electrically and which has a width equal to or larger than a minimum width in a design rule, the active region is provided in a region subjected to local thermal treatment for controlling a random failure occurrence rate in the manufacturing process, a surface of the active region is silicided to form a silicide layer, and the specific identification number is set based on irregular resistance rise by disconnection of the silicided layer in the active region.

In the case where each of the elements of the electronic device in the present invention has the access transistor, it is possible that each of the elements includes a gate wiring which is connected to the access transistor electrically and which has a width equal to or larger than a minimum width in a design rule, the gate wiring is provided in a region subjected to local thermal treatment for controlling a random failure occurrence rate in the manufacturing process, a surface of the gate wiring is silicided to form a silicided layer, and the specific identification number is set based on irregular resistance rise by disconnection of the silicided layer in the gate wiring.

In the case where each of the elements of the electronic device in the present invention has the access transistor, it is possible that a gate electrode of the access transistor has a width equal to or larger than a minimum width in a design rule and is provided in a region subjected to local thermal treatment for controlling a random failure occurrence rate in the manufacturing process, a surface of the gate electrode is silicided to form a silicided layer, and the specific identification number is set based on irregular deviation in threshold value of the access transistor which is caused by full silicidation in the gate electrode.

In the case where each of the elements of the electronic device in the present invention has the access transistor of which the surface of the gate electrode is silicided, the silicided layer of the gate electrode may be made of cobalt silicide or nickel silicide.

An electronic device manufacturing method according to the present invention is a method for manufacturing an electronic device which includes an element group that is composed of a plurality of elements and generates a specific identification number and of which specific identification number is set based on irregular deviation in electric characteristic of an element which is caused due to a random failure in a manufacturing process, the method including the steps of forming, on a substrate, an access transistor electrically connected to an active region or a gate wiring, each having a silicided surface, or an access transistor including a gate electrode that is fully silicided at least locally; and performing local thermal treatment to a region where the active region, the gate wiring, or the gate electrode is arranged.

In the present invention, the irregular deviation in electric characteristic of an element which is caused due to a random failure in the manufacturing process is utilized as a specific identification number, so that the specific identification number can be set for the device without a new step added to the general manufacturing process. Further, the conventionally utilized variation in physical quantity of an identification element which corresponds to process variation is on a micro scale while the variation in electric characteristic of an element which is caused due to a failure is comparatively large variation, in other words, is irregular deviation. Accordingly, the specific identification number can be recognized with high reliability independent from environment where the element is situated (for example, temperature environment). Further, the specific identification number is impossible to be changed from outside naturally, and therefore, an artificially unforgeable semiconductor chips and the like applicable to IC money, IC tags, ID cars, and the like can be obtained.

As described above the electronic device and the manufacturing method thereof according to the present invention enable assignment of a specific identification number to an electronic device with high reliability without a new step added to the general manufacturing process.

It is also important to note that all of the structures in the present invention have a self-protection feature from intentional destruction to change the specific identification number. When one tries to change the identification number by physical means, the bit lines or the wirings that overlap the element area are easily broken. With the self-protection feature, it is impossible to make effectual change of the identification number even with intention by physical means.

DETAILED DESCRIPTION OF THE INVENTION

Embodiment 1

An electronic device according to Embodiment 1 of the present invention, specifically, an electronic device having a semiconductor element array that generates a specific identification number will be described below with reference to the drawings.

Figure 1:
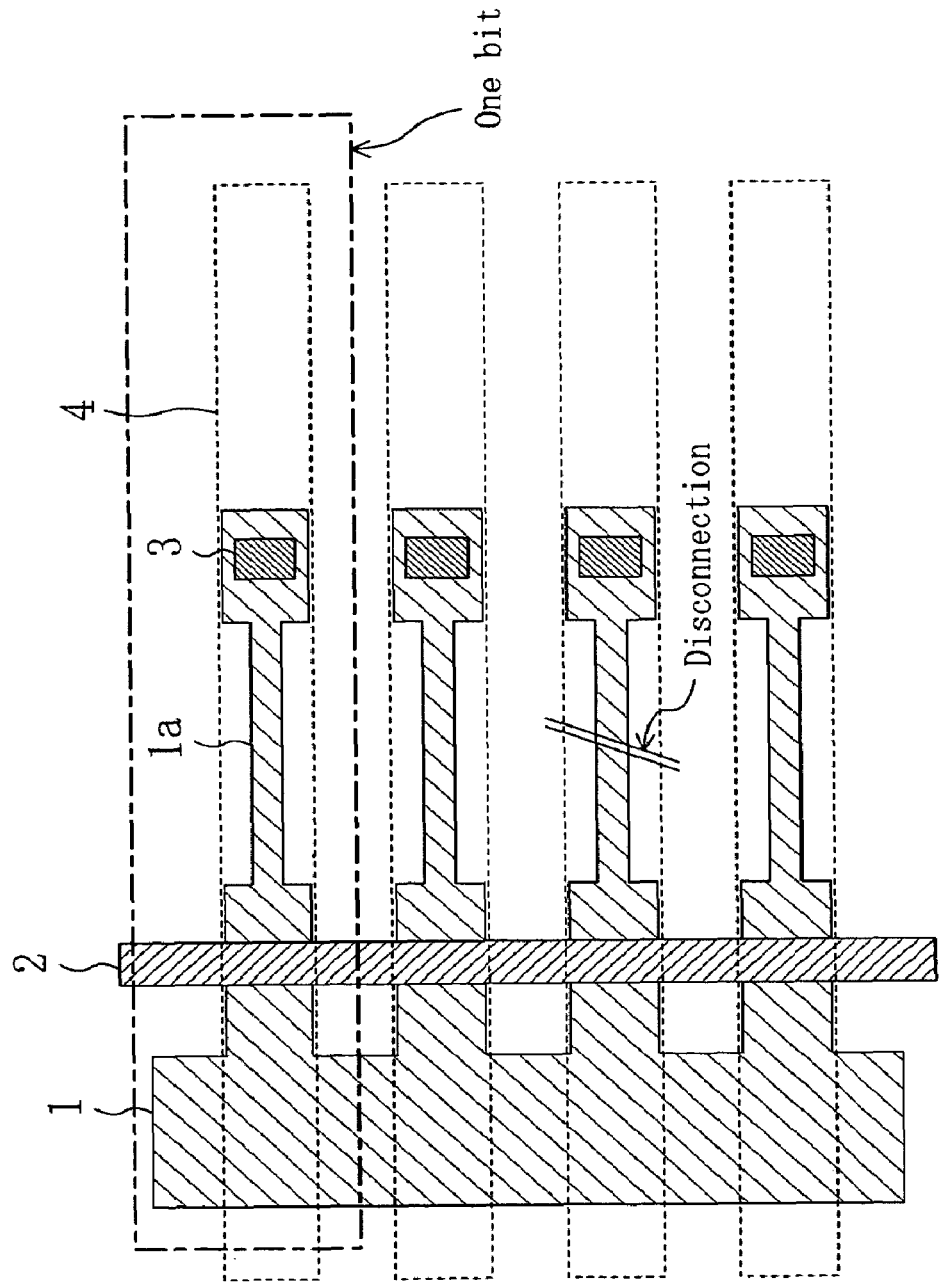
FIG. 1 is a diagram schematically showing a layout of a semiconductor element array in an electronic device according to Embodiment 1 of the present invention.

FIG. 1 is a diagram schematically showing a layout of the semiconductor element array in the electronic device according to Embodiment 1.

As shown in FIG. 1, the semiconductor element array in the present embodiment includes a plurality of access transistors composed of an active region (OD) 1 to serve as a pair of a source region and a drain region and a gate electrode 2 formed on the active region 1 to serve as a word line. Wherein, the active region 1 includes a region which is connected to at least one of the source region and the drain region and which the plurality of access transistors share in common and a partially thinned region lead out from the other one of the source region and the drain region. In short, the active region 1 has an OD thinned wiring 1a. Further, the surface of the active region 1 including the OD thinned wiring 1a is silicided. A via contact 3 is formed on the end part (a contact region) of the active region 1 which is lead out from the other one of the source region and the drain region so that the active region 1 is electrically connected through the via contact 3 to an upper wiring 4 serving as a bit line.

Figure 2:
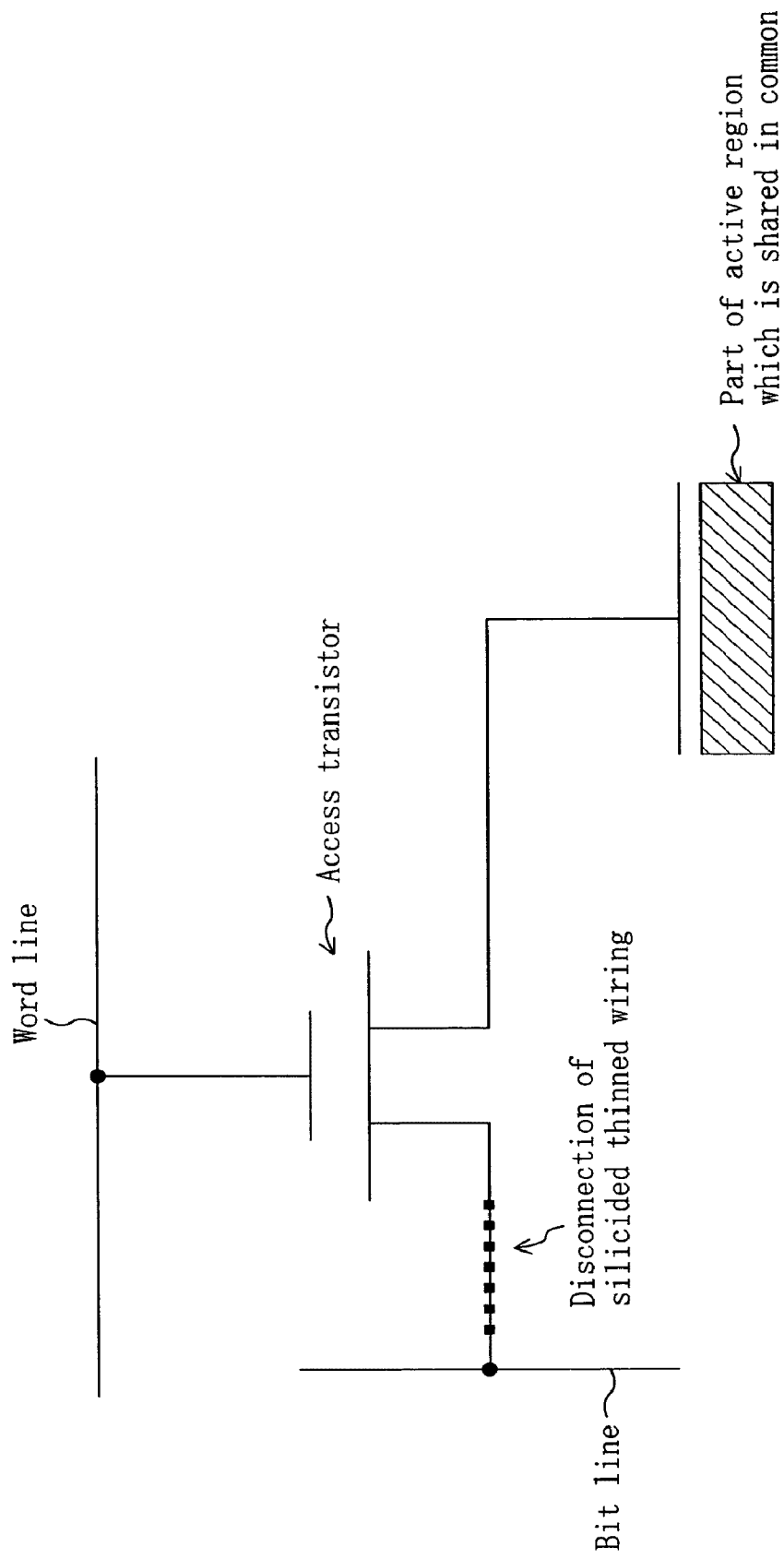
FIG. 2 is a diagram schematically showing a one-bit circuit constitution of the semiconductor element array in the electronic device according to Embodiment 1 of the present invention.

In the present embodiment, a necessary number of one-bit configurations, one of which is enclosed by a dash-and-dot line in FIG. 1, are arranged in an array to form a memory element group (the semiconductor element array) that generates a specific identification number. FIG. 2 schematically shows the one-bit circuit configuration.

Accordingly, in the present embodiment, the formation of the OD thinned wiring 1a in the active region 1 enables increase in possibility of accidental occurrence of irregular resistance rise in the manufacturing process which is caused by disconnection of the silicided layer of the OD thinned wiring 1a. Accordingly, when an access transistor is selected through a word line, the presence or absence of the resistance rise is recognized as variation in output from a corresponding bit line through the selected access transistor, resulting in detection of the presence or absence of the resistance rise by a sense amplifier. In consequence, a specific identification number can be set based on the irregular deviation in electric characteristic of the element composing the semiconductor element array in the present embodiment which is caused due to a random failure in the manufacturing process.

In the present embodiment, the irregular deviation in electric characteristic of an element which is caused due to a random failure in the manufacturing process is utilized as a specific identification number, so that the specific identification number can be set for the device without a new step added to the general manufacturing process. Further, the conventionally utilized variation in physical quantity of an identification element which corresponds to process variation is on a micro scale while the variation in electric characteristic of an element which is caused due to a failure is comparatively large variation, in other words, is irregular deviation. Accordingly, the specific identification number can be indicated with high reliability independent from environment where the element is situated (for example, temperature environment). Further, the specific identification number is impossible to be changed from outside naturally, and therefore, an artificially unforgeable semiconductor chip and the like applicable to IC money, IC tags, ID cars, and the like can be obtained.

It is noted that in the present embodiment, outputs from the bit lines, that is, variation in electric characteristic of the elements may be dealt with as binary (0/1) information with a predetermined threshold value set. In this case, a specific number of 2 raised to power of "an ordinal number of elements" can be generated.

Further, it is preferable that the width of the OD thinned line 1a is set smaller than the minimum width in the design rule (the minimum width on design which invites no failure without any flaw by particles, for example, and the like). This enables further increase in possibility that irregular resistance rise by disconnection of the silicided layer of the OD thinned wiring 1a occurs accidentally in the manufacturing process.

Figure 3:
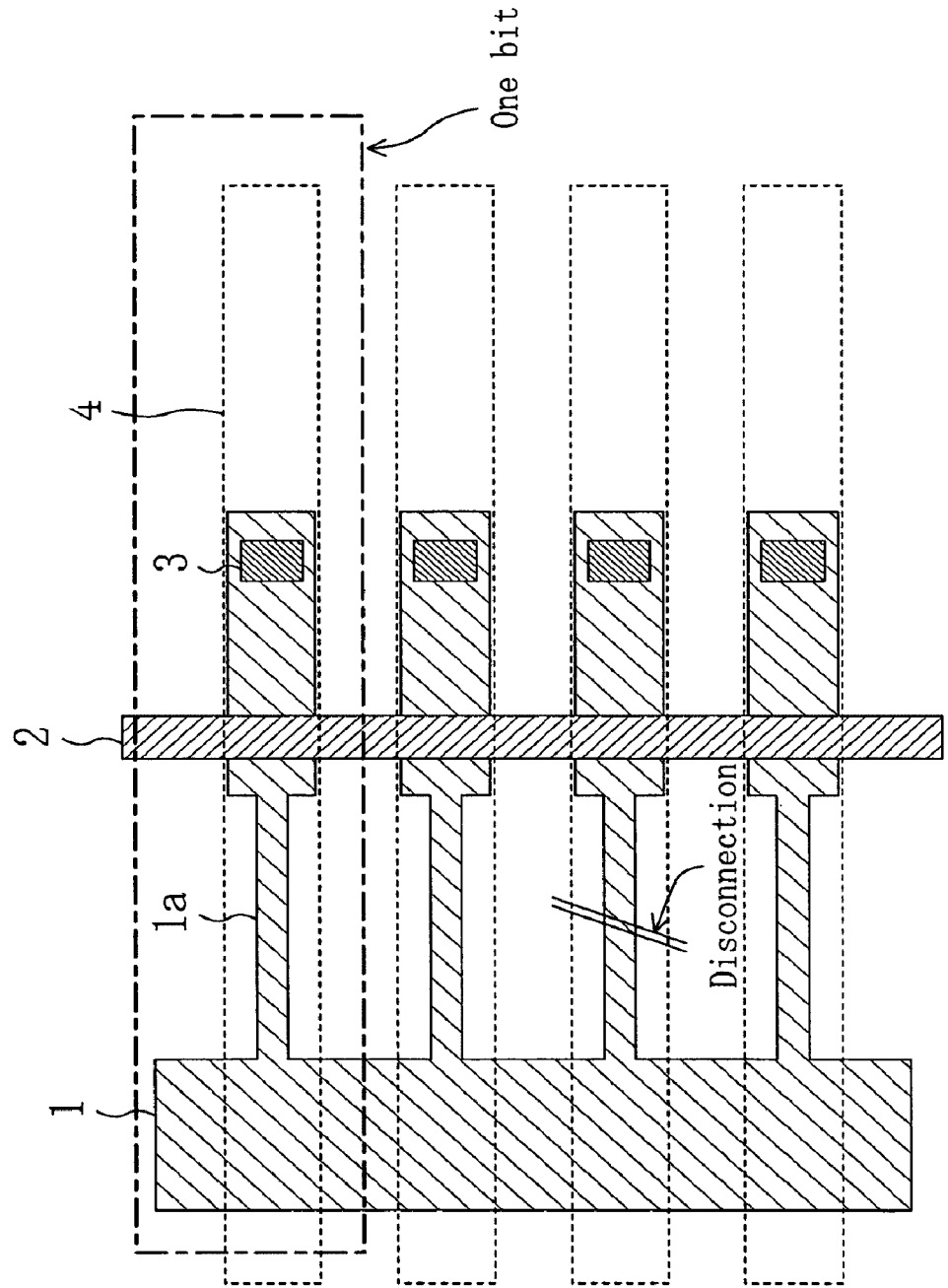
FIG. 3 is a diagram schematically showing another example of a layout of a semiconductor element array in an electronic device according to Embodiment 1 of the present invention.

In addition, in the present embodiment, the OD thinned wiring 1a is formed on the contact region (via contact 3) side but may, of course, be formed on a common region side of the active region 1, as shown in FIG. 3.

Embodiment 2

An electronic device according to Embodiment 2 of the present invention, specifically, an electronic device having a semiconductor element array that generates a specific identification number will be described below with reference to the drawing.

Figure 4:
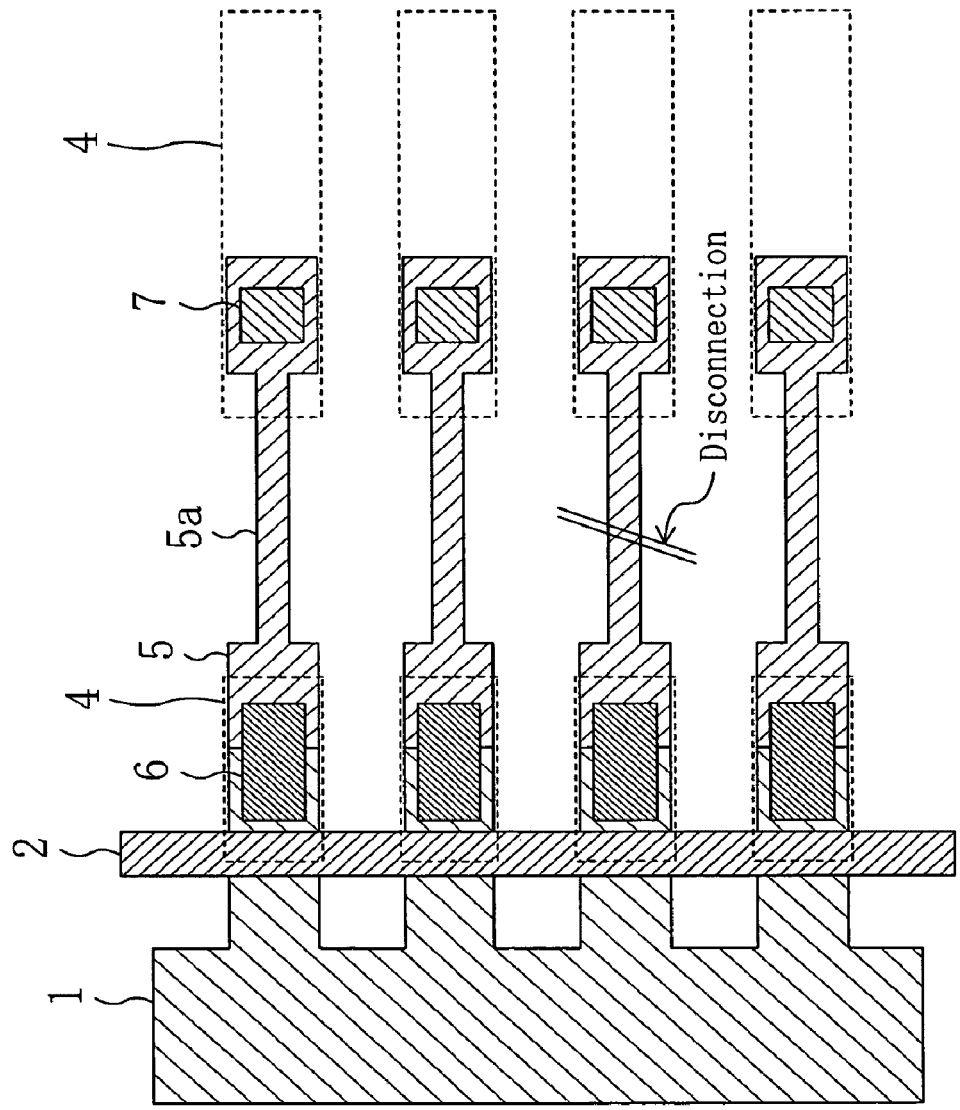
FIG. 4 is a diagram schematically showing a layout of a semiconductor element array in an electronic device according to Embodiment 2 of the present invention.

FIG. 4 schematically shows a layout of the semiconductor element array in the electronic device according to Embodiment 2.

As shown in FIG. 4, the semiconductor element array in the present embodiment includes a plurality of access transistors composed of an active region (OD) 1 to serve as a pair of a source region and a drain region and a gate electrode 2 formed on the active region 1 to serve as a word line. Wherein, the active region 1 includes a region which is connected to at least one of the source region and the drain region and which the plurality of access transistors share in common. The other one of the source region and the drain region is connected to one end part of a gate wring (a wiring formed on the same layer where the gate electrode 2 is formed) 5 through a shared contact 6. A via contact 7 is formed on the other end part (a contact region) of the gate wiring 5 so that the gate wiring 5 is electrically connected through the via contact 7 to an upper wiring 4 serving as a bit line.

The gate wiring 5 is thinned partially. In other words, the gate wiring 5 includes a thinned gate wiring 5a. Also, the surface of the gate wiring 5 including the thinned gate wiring 5a is silicided.

In the present embodiment, a necessary number of one-bit configurations each composed of the aforementioned access transistor, the gate wiring 5 connected thereto, and the like are arranged in an array to form a memory element group (the semiconductor element array) that generates a specific identification number.

Accordingly, in the present embodiment, the formation of the thinned gate wiring 5a in the gate wiring 5 enables increase in possibility of accidental occurrence of irregular resistance rise in the manufacturing process which is caused by disconnection of the silicided layer of the OD thinned wiring 5a. Accordingly, when an access transistor is selected through a word line, the presence or absence of the resistance rise is recognized as variation in output from a corresponding bit line through the selected access transistor, resulting in detection of the presence or absence of the resistance rise by a sense amplifier. In consequence, a specific identification number can be set based on the irregular deviation in electric characteristic of the element composing the semiconductor element array in the present embodiment which caused due to a random failure in the manufacturing process.

In the present embodiment, the irregular deviation in electric characteristic of an element which is caused due to a random failure in the manufacturing process is utilized as a specific identification number, so that the specific identification number can be set for the device without a new step added to the general manufacturing process. Further, the conventionally utilized variation in physical quantity of an identification element which corresponds to process variation is on a micro scale while the variation in electric characteristic of an element which is caused due to a failure is comparatively large variation, in other words, is irregular deviation. Accordingly, the specific identification number can be indicated with high reliability independent from environment where the element is situated (for example, temperature environment). Further, the specific identification number is impossible to be changed from outside naturally, and therefore, an artificially unforgeable semiconductor chip and the like applicable to IC money, IC tags, ID cars, and the like can be obtained.

It is noted that in the present embodiment, outputs from the bit lines, that is, variation in electric characteristic of the elements) may be dealt with as binary (0/1) information with a predetermined threshold value set. In this case, a specific number of 2 raised to power of "an ordinal number of elements" can be generated.

Further, it is preferable that the width of the thinned gate wiring 5a is set smaller than the minimum width in the design rule (the minimum width on design which invites no failure without any flaw by particles, for example, and the like). This enables further increase in possibility that irregular resistance rise by disconnection of the silicided layer of the thinned gate wiring 5a occurs accidentally in the manufacturing process.

Embodiment 3

An electronic device according to Embodiment 3 of the present invention, specifically, an electronic device having a semiconductor element array that generates a specific identification number will be described below with reference to the drawing.

Figure 5:
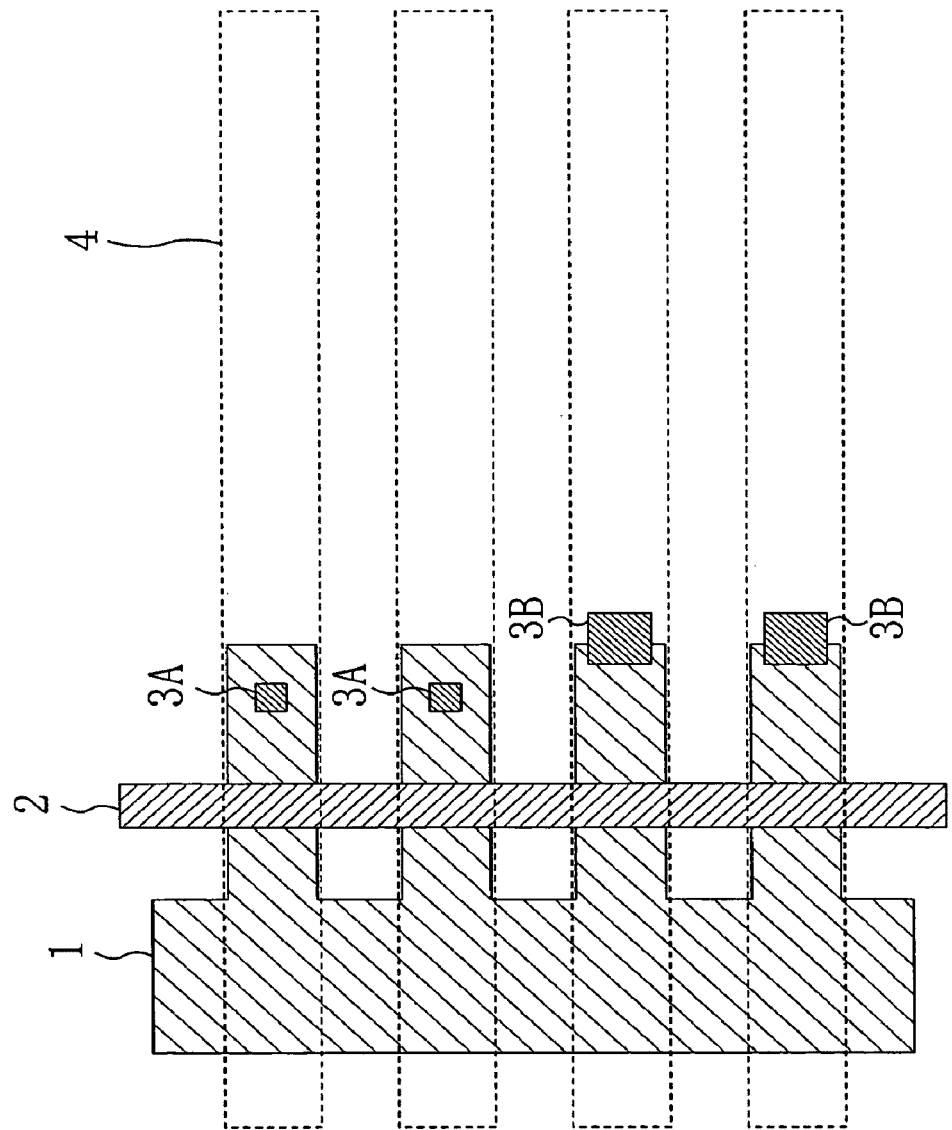
FIG. 5 is a diagram schematically showing a layout of a semiconductor element array in an electronic device according to Embodiment 3 of the present invention.

FIG. 5 schematically shows a layout of the semiconductor element array in the electronic device according to Embodiment 3.

As shown in FIG. 5, the semiconductor element array in the present embodiment includes a plurality of access transistors composed of an active region (OD) 1 to serve as a pair of a source region and a drain region and a gate electrode 2 formed on the active region 1 to serve as a word line. Wherein, the active region 1 includes a region which is connected to at least one of the source region and the drain region and which the plurality of access transistors share in common. A via contact 3 is formed on the end part (a contact region) of other one of the source region and the drain region so that the active region 1 is electrically connected through the via contact 3 to an upper wiring 4 serving as a bit line.

Wherein, in the present embodiment, a via contact 3A having a diameter smaller than a diameter designed based on the design rule or a via contact 3B a predetermined distance or a further distance shifted from the active region 1, that is, a via contact 3B extending over the active region 1 and an isolation region surrounding the active region 1 is formed as the via contact 3.

In the present embodiment, a necessary number of one-bit configurations each composed of the aforementioned access transistor, the wiring 4 connected thereto, and the like are arranged in an array to form a memory element group (the semiconductor element array) that generates a specific identification number.

Accordingly, in the present embodiment, the via contact 3A having a diameter smaller than a diameter designed based on the design rule or the via contact 3B extending over the active region 1 and the isolation region surrounding the active region 1 is formed as the via contact 3, enabling increase in possibility of accidental occurrence of irregular resistance rise in the manufacturing process which is caused by connection failure between the active region 1 and the via contact 3A or the via contact 3B. Accordingly, when an access transistor is selected through a word line, the presence or absence of the resistance rise is recognized as variation in output from a corresponding bit line through the selected access transistor, resulting in detection of the presence or absence of the resistance rise by a sense amplifier. In consequence, a specific identification number can be set based on the irregular deviation in electric characteristic of the elements composing the semiconductor element array in the present embodiment which is caused due to a random failure in the manufacturing process.

In the present embodiment, the irregular deviation in electric characteristic of an element which is caused due to a random failure in the manufacturing process is utilized as a specific identification number, so that the specific identification number can be set for the device without a new step added to the general manufacturing process. Further, the conventionally utilized variation in physical quantity of an identification element which corresponds to process variation is on a micro scale while the variation in electric characteristic of an element which caused is due to a failure is comparatively large variation, in other words, is irregular deviation. Accordingly, the specific identification number can be indicated with high reliability independent from environment where the element is situated (for example, temperature environment). Further, the specific identification number is impossible to be changed from outside naturally, and therefore, an artificially unforgeable semiconductor chip and the like applicable to IC money, IC tags, ID cars, and the like can be obtained.

It is noted that in the present embodiment, outputs from the bit lines, that is, variation in electric characteristic of the elements) may be dealt with as binary (0/1) information with a predetermined threshold value set. In this case, a specific number of 2 raised to power of "an ordinal number of elements" can be generated.

Further, it is preferable that the diameter of the via contact 3A is set smaller than the minimum diameter in the design rule (the minimum diameter on design which invites no failure without any flaw by particles, for example, and the like). This enables further increase in possibility that irregular resistance rise by connection failure of the via contact 3A occurs accidentally in the manufacturing process.

Embodiment 4

An electronic device according to Embodiment 4 of the present invention, specifically, an electronic device having a semiconductor element array that generates a specific identification number will be described below with reference to the drawing.

Figure 6:
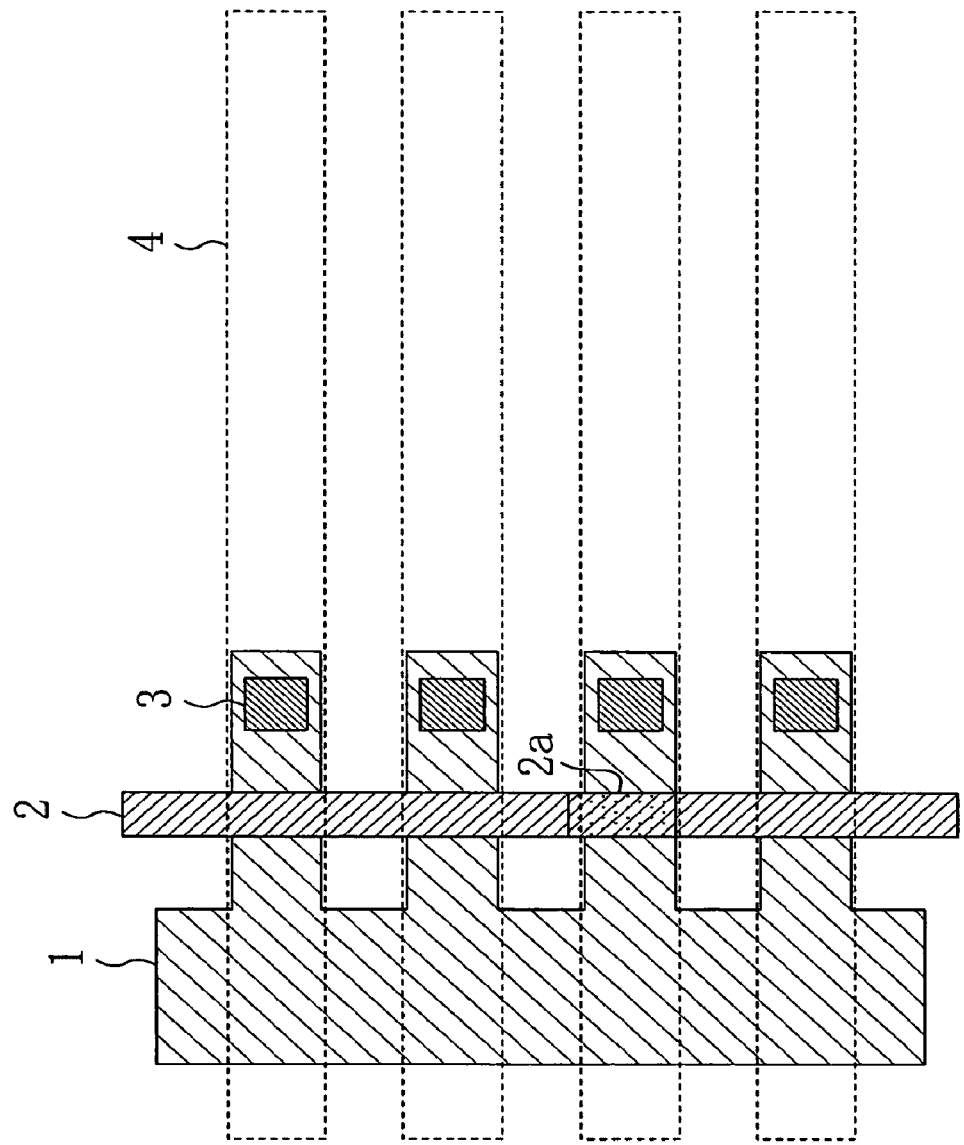
FIG. 6 is a diagram schematically showing a layout of a semiconductor element array in an electronic device according to Embodiment 4 of the present invention.

FIG. 6 schematically shows a layout of the semiconductor element array in the electronic device according to Embodiment 4.

As shown in FIG. 6, the semiconductor element array in the present embodiment includes a plurality of access transistors composed of an active region (OD) 1 to serve as a pair of a source region and a drain region and a gate electrode 2 formed on the active region 1 to serve as a word line. Wherein, the active region 1 includes a region which is connected to at least one of the source region and the drain region and which the plurality of access transistors share in common. A via contact 3 is formed on the end part (a contact region) of the other one of the source region and the drain region so that the active region 1 is electrically connected through the via contact 3 to an upper wiring 4 serving as a bit line.

In the present embodiment, polysilicon is used as a material of the gate electrode 2 and the surface of the gate electrode 2 is silicided. Further, the width of the gate electrode 2 is set smaller than the width set based on the design rule so that the polysilicon forming the gate electrode 2 exhibits excess reactivity locally through silicidation of the gate electrode 2. This allows a phenomenon (full silicidation) that the silicide layer reaches the gate insulating film to be caused easily. In this way, a fully silicided (FUSI) electrode 2a having a work function different from that of the other gate electrodes 2 is formed, resulting in local formation of an access transistor having a threshold value (Vt) different from the other access transistors (as to threshold value variation by full silicidation, see "Threshold voltage control in NiSi-gated MOSFETs through silicidation induced impurity segregation (SIIS)," by Jakub Kedzierski et al., Technical Digest of International Electron Devices Meeting, 2003, for example).

In the present embodiment, a necessary number of one-bit configurations each composed of the aforementioned access transistor, the wiring 4 connected thereto, and the like are arranged in an array to form a memory element group (the semiconductor element array) that generates a specific identification number.

Accordingly, in the present embodiment, the thinning the gate electrode 2 enables increase in possibility that irregular deviation in threshold value of an access transistor which is caused by local full silicidation in the gate electrode 2 occurs accidentally in the manufacturing process. Accordingly, when an access transistor is selected through a word line, the presence or absence of the variation in threshold value is recognized as variation in output from a corresponding bit line through the selected access transistor, resulting in detection of the presence or absence of the resistance rise by a sense amplifier. In consequence, a specific identification number can be set based on the irregular deviation in electric characteristic of the element composing the semiconductor element array in the present embodiment which is caused due to a random failure in the manufacturing process.

In the present embodiment, the irregular deviation in electric characteristic of an element which is caused due to a random failure in the manufacturing process is utilized as a specific identification number, so that the specific identification number can be set for the device without a new step added to the general manufacturing process. Further, the conventionally utilized variation in physical quantity of an identification element which corresponds to process variation is on a micro scale while the variation in electric characteristic of the elements which is caused due to a failure is comparatively large variation, in other words, is irregular deviation. Accordingly, the specific identification number can be indicated with high reliability independent from environment where the element is situated (for example, temperature environment). Further, the specific identification number is impossible to be changed from outside naturally, and therefore, an artificially unforgeable semiconductor chip and the like applicable to IC money, IC tags, ID cars, and the like can be obtained.

It is noted that in the present embodiment, outputs from the bit lines, that is, variation in electric characteristic of the elements may be dealt with as binary (0/1) information with a predetermined threshold value set. In this case, a specific number of 2 raised to power of "an ordinal number of elements" can be generated.

Further, it is preferable that the width of the gate electrode 2 is set smaller than the minimum width in the design rule (the minimum width on design which invites no failure without any flaw by particles, for example, and the like). This enables further increase in possibility that irregular deviation in threshold value which is caused by full silicidation in the gate electrode 2 occurs accidentally in the manufacturing process.

In addition, in the present embodiment, a cobalt silicide layer or a nickel silicide layer may be used as the silicided layer in the gate electrode 2.

Embodiment 5

An electronic device according to Embodiment 5 of the present invention, specifically, an electronic device having a semiconductor element array that generates a specific identification number will be described below with reference to the drawing.

Figure 7:
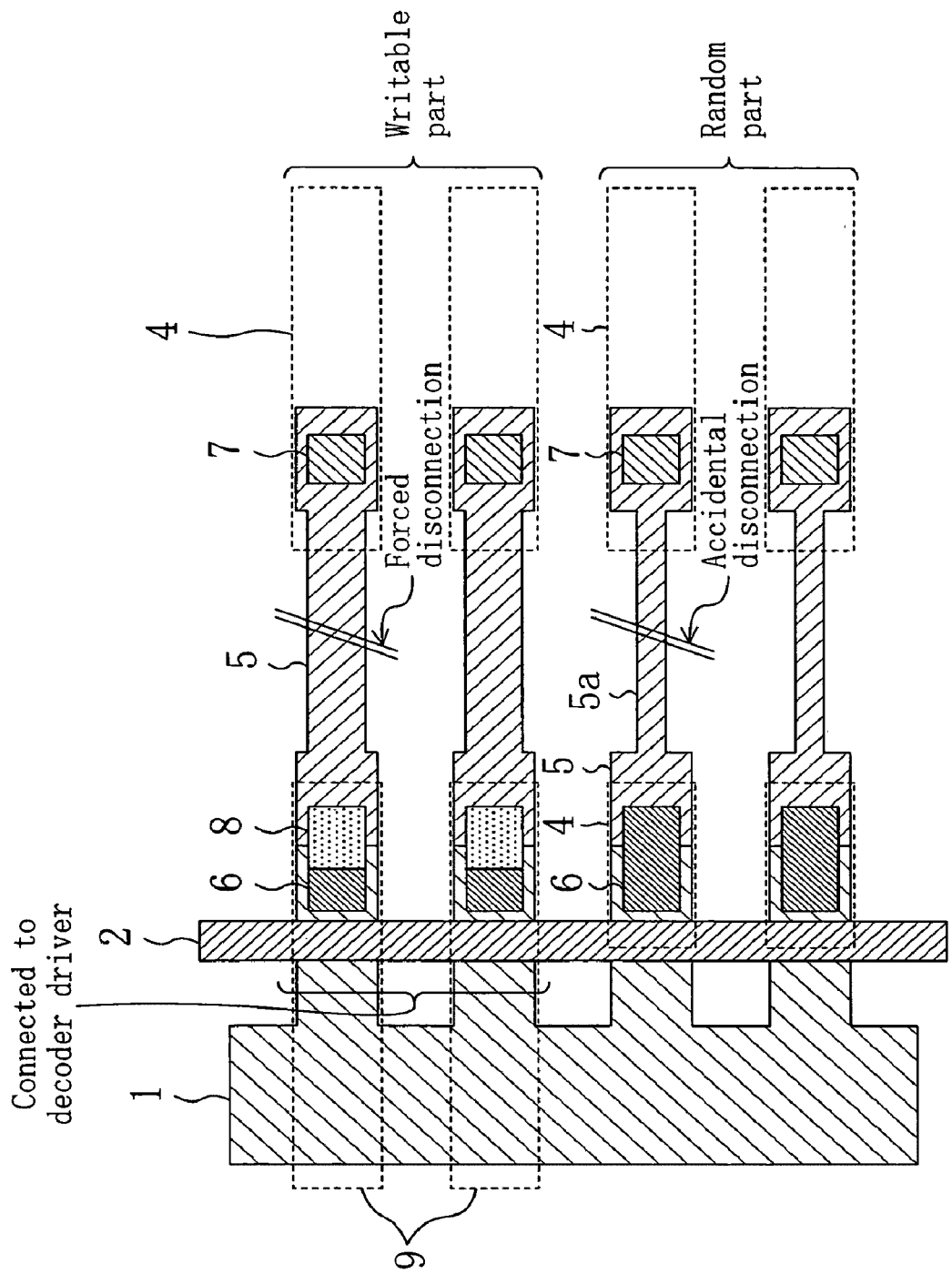
FIG. 7 is a diagram schematically showing a layout of a semiconductor element array in an electronic device according to Embodiment 5 of the present invention.

FIG. 7 schematically shows a layout of the semiconductor element array in the electronic device according to Embodiment 5.

As shown in FIG. 7, the semiconductor element array in the present embodiment is composed of a first element group (a part capable of being written, hereinafter referred to as a writable part) having an electric fuse that invites disconnection of a silicided layer through writing from outside and a second element group (a random part) having a physical fuse that invites disconnection of the silicided layer which is caused due to a random failure.

The layout of the elements in the random part is basically the same as the layout of the semiconductor element array in the electronic device according to Embodiment 2 shown in FIG. 4. Specifically, each element in the random part includes an access transistor composed of an active region (OD) 1 to serve as a pair of a source region and a drain region and a gate electrode 2 formed on the active region 1 to serve as a word line. The active region 1 includes a region which is electrically connected to one of the source region and the drain region and which a plurality of access transistors (including an access transistor of an element in the writable part described later) share in common. Further, the other one of the source region and the drain region is connected to one end part of a gate wiring 5 through a shared contact 6. A via contact 7 is formed on the other end part (a contact region) of the gate wiring 5 so that the gate wiring 5 is electrically connected through the via contact 7 to an upper wiring 4 serving as a bit line.

Wherein, the gate wiring 5 in the random part is thinned partially. In other words, the gate wiring 5 in the random part includes a thinned gate wiring 5a. Further, the surface of the gate wiring 5 including the thinned gate wiring 5a is silicided.

On the other hand, each element in the writable part includes, similar to the elements in the random part, an access transistor composed of an active region (OD) 1 to serve as a pair of a source region and a drain region and a gate electrode 2 formed on the active region 1 to serve as a word line.

Difference of the elements in the writable part from those in the random part lies in that the gate wiring 5 is not thinned for preventing the silicided layer from being disconnected due to a random failure, namely, for preventing irregular resistance rise. In other words, the gate wiring 5 in the writable part has a line width defined on the design rule. Wherein, the surface of the gate wiring 5 in the writable part is silicided also. Further, the access transistor in the writable part is connected to a write decoder (decoder driver) through another contact 8 formed on the shared contact 6 and another wiring 9 for connecting the contact 8.

In the thus composed random part of the semiconductor element array in the present embodiment, a necessary number of one-bit configurations each composed of the aforementioned access transistor, the gate wiring 5 connected thereto, and the like are arranged in an array to form a memory element group that generates a specific identification number. Wherein, the formation of the thinned gate wiring 5a in the gate wiring 5 in the random part, as described above, enables increase in possibility that irregular resistance rise by disconnection of the silicided layer of the thinned gate wiring 5a occurs accidentally in the manufacturing process. Accordingly, when an access transistor in the random part is selected through a word line, the presence or absence of the resistance rise is recognized as variation in output from a corresponding bit line through the selected access transistor, resulting in detection of the presence or absence of the resistance rise by a sense amplifier. In consequence, a specific identification number can be set based on the irregular deviation in electric characteristic of an element composing the random part which is caused due to a random failure in the manufacturing process.

In the present embodiment, the irregular deviation in electric characteristic of an element which is caused due to a random failure in the manufacturing process is utilized as a specific identification number, so that the specific identification number can be set for the device without a new step added to the general manufacturing process. Further, the conventionally utilized variation in physical quantity of an identification element which corresponds to process variation is on a micro scale while the variation in electric characteristic of the element which is due to a failure is comparatively large variation, in other words, is irregular deviation. Accordingly, the specific identification number can be indicated with high reliability independent from environment where the element is situated (for example, temperature environment). Further, the specific identification number is impossible to be changed from outside naturally, and therefore, an artificially unforgeable semiconductor chip and the like applicable to IC money, IC tags, ID cars, and the like can be obtained.

Moreover, in the semiconductor element array in the present embodiment, there are provided the two parts of the writable part having the electrical fuse that invites disconnection (forced disconnection) of the silicided layer through writing from outside and the random part having the physical fuse that invites disconnection (accidental disconnection) of the silicided layer which is caused due to a random failure. With the two parts provided, information such as a check digit used for parity check is written into the writable part, generating a more highly reliable specific identification number.

It is noted that in the present embodiment, outputs from the bit lines in the random part, that is, variation in electric characteristic of the element may be dealt with as binary (0/1) information with a predetermined threshold value set. In this case, a specific number of 2 raised to power of "an ordinal number of elements" can be generated.

In addition, it is preferable that the width of the thinned gate wiring 5a in the random part is set smaller than the minimum width in the design rule (the minimum width on design which invites no failure without any flaw by particles, for example, and the like). This enables further increase in possibility that irregular resistance rise by disconnection of the silicided layer of the thinned gate wiring 5a occurs accidentally in the manufacturing process.

Embodiment 6

Figure 8:
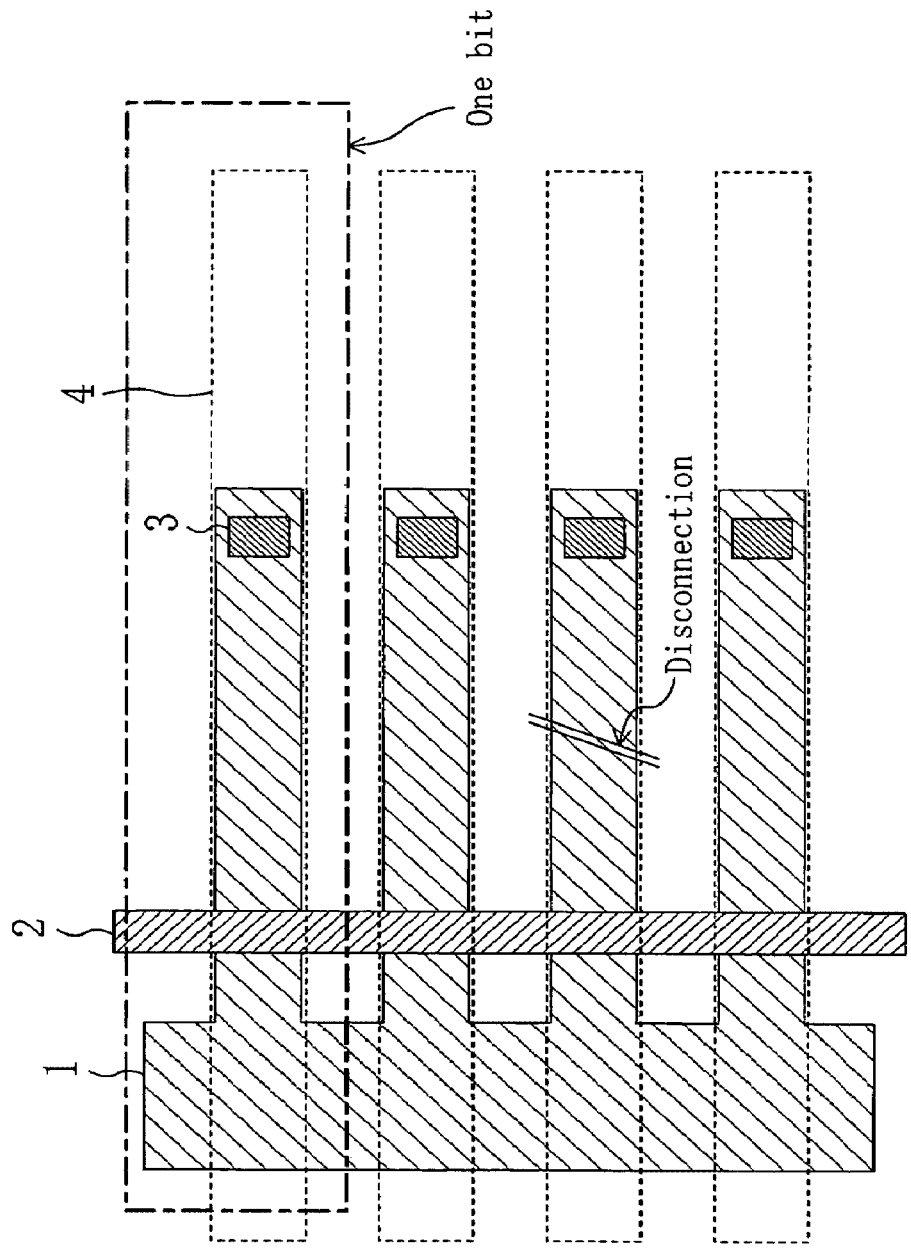
FIG. 8 is a diagram schematically showing a layout of a semiconductor element array in an electronic device according to Embodiment 6 of the present invention.

An electronic device according to Embodiment 6 of the present invention, specifically, an electronic device having a semiconductor element array that generates a specific identification number will be described below with reference to the drawings FIG. 8 schematically shows a layout of the semiconductor element array in the electronic device according to Embodiment 6.

As shown in FIG. 8, the semiconductor element array in the present embodiment includes a plurality of access transistors composed of an active region (OD) 1 to serve as a pair of a source region and a drain region and a gate electrode 2 formed on the active region 1 to serve as a word line. Wherein, the active region 1 includes a region which is electrically connected to at least one of the source region and the drain region and which the plurality of access transistors share in common and a region lead out from the other one of the source region and the drain region (the region being not thinned, different from the case in Embodiment 1). The surface of the active region 1 is silicided. Further, a via contact 3 is formed on the end part (a contact region) of the active region 1 which is lead out from the other one of the source region and the drain region so that the active region 1 is electrically connected through the via contact 3 to an upper wiring 4 serving as a bit line.

In the present embodiment, a necessary number of one-bit configurations, one of which is enclosed by a dash-and-dot line in FIG. 8, are arranged in an array to form a memory element group (the semiconductor element array) that generates a specific identification number.

Figure 9:
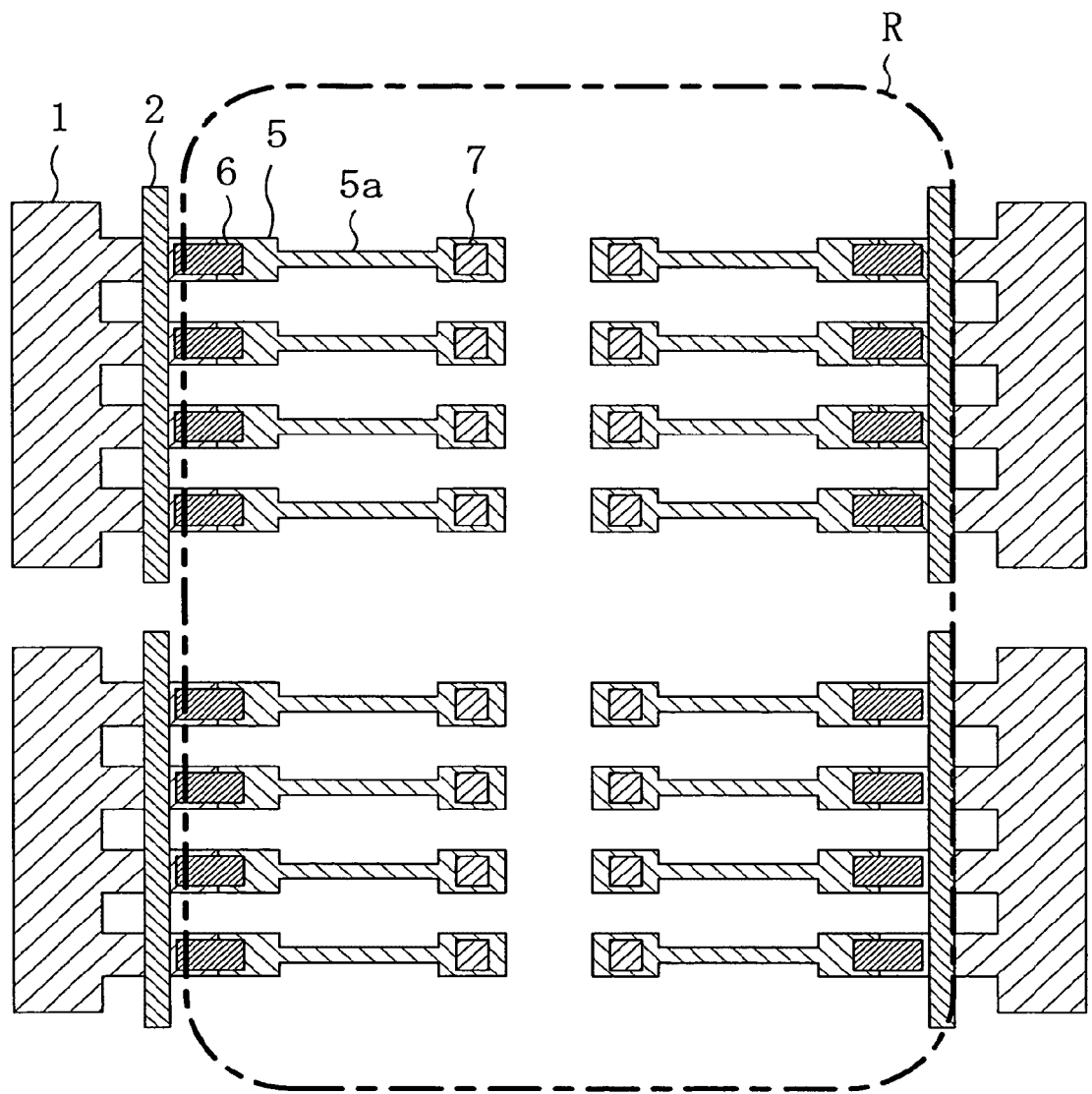
FIG. 9 is a diagram schematically showing a layout of a semiconductor element array in an electronic device according to Embodiments 6 to 8 of the present invention.

Moreover, in the present embodiment, using the semiconductor element array shown in FIG. 8 as one unit, a plurality of such units are arranged as shown, for example, in FIG. 9 (the respective elements shown in FIG. 9 correspond to the elements shown in FIG. 4 in Embodiment 2). This enables concentrated arrangement of the active regions 1 functioning as the memory elements within a predetermined region R.

Further, in the present embodiment, an additional step of locally heating the predetermined region R, that is, the active regions 1 in the semiconductor element arrays of the present embodiment is performed after a step called a second silicide RTP (rapid thermal process) in a general CMOS (complementary metal-oxide semiconductor device) manufacturing process. This enables increase in possibility of accidental occurrence of irregular resistance rise by disconnection of the silicided layer in the active region 1. Accordingly, when an access transistor is selected through a word line, the presence or absence of the resistance rise is recognized as variation in output from a corresponding bit line through the selected access transistor, resulting in detection of the presence or absence of the resistance rise by a sense amplifier. In consequence, a specific identification number can be set based on the irregular deviation in electric characteristic of the element composing the semiconductor element array in the present embodiment which is caused due to a random failure in the manufacturing process.

In the present embodiment, the irregular deviation in electric characteristic of an element which is caused due to a random failure in the manufacturing process is utilized as a specific identification number. The conventionally utilized variation in physical quantity of an identification element which corresponds to process variation is on a micro scale while the variation in electric characteristic of the elements which is caused due to a failure is comparatively large variation, in other words, is irregular deviation. Accordingly, the specific identification number can be indicated with high reliability independent from environment where the element is situated (for example, temperature environment). Further, the specific identification number is impossible to be changed from outside naturally, and therefore, an artificially unforgeable semiconductor chip and the like applicable to IC money, IC tags, ID cars, and the like can be obtained.

The present embodiment requires an additional step of subjecting the active regions 1 to the local thermal treatment. However, no step is necessitated which does not comply with the design rule, such as the formation of the OD thinned wiring 1a, for example, in Embodiment 1, for intentionally causing the irregular resistance rise by disconnection of the silicided layer in the active regions 1. Hence, a side effect derived from particle generation and the like in the process can be prevented.

It is noted that in the present embodiment, outputs from the bit lines, that is, variation in electric characteristic of the elements may be dealt with as binary (0/1) information with a predetermined threshold value set. In this case, a specific number of 2 raised to power of "an ordinal number of elements" can be generated.

In addition, in the present embodiment, a cobalt silicide layer or a nickel silicide layer may be used as the silicided layer in the active region 1. For using the cobalt silicide layer, the temperature for the thermal treatment for locally heating the active region 1 is preferably set within the range between 800° C. and 900° C., both inclusive. On the other hand, for using the nickel silicide layer, the temperature for the thermal treatment is preferably set within the range between 500° C. and 700° C., both inclusive.

Embodiment 7

An electronic device according to Embodiment 7 of the present invention, specifically, an electronic device having a semiconductor element array that generates a specific identification number will be described below with reference to the drawing.

Figure 10:
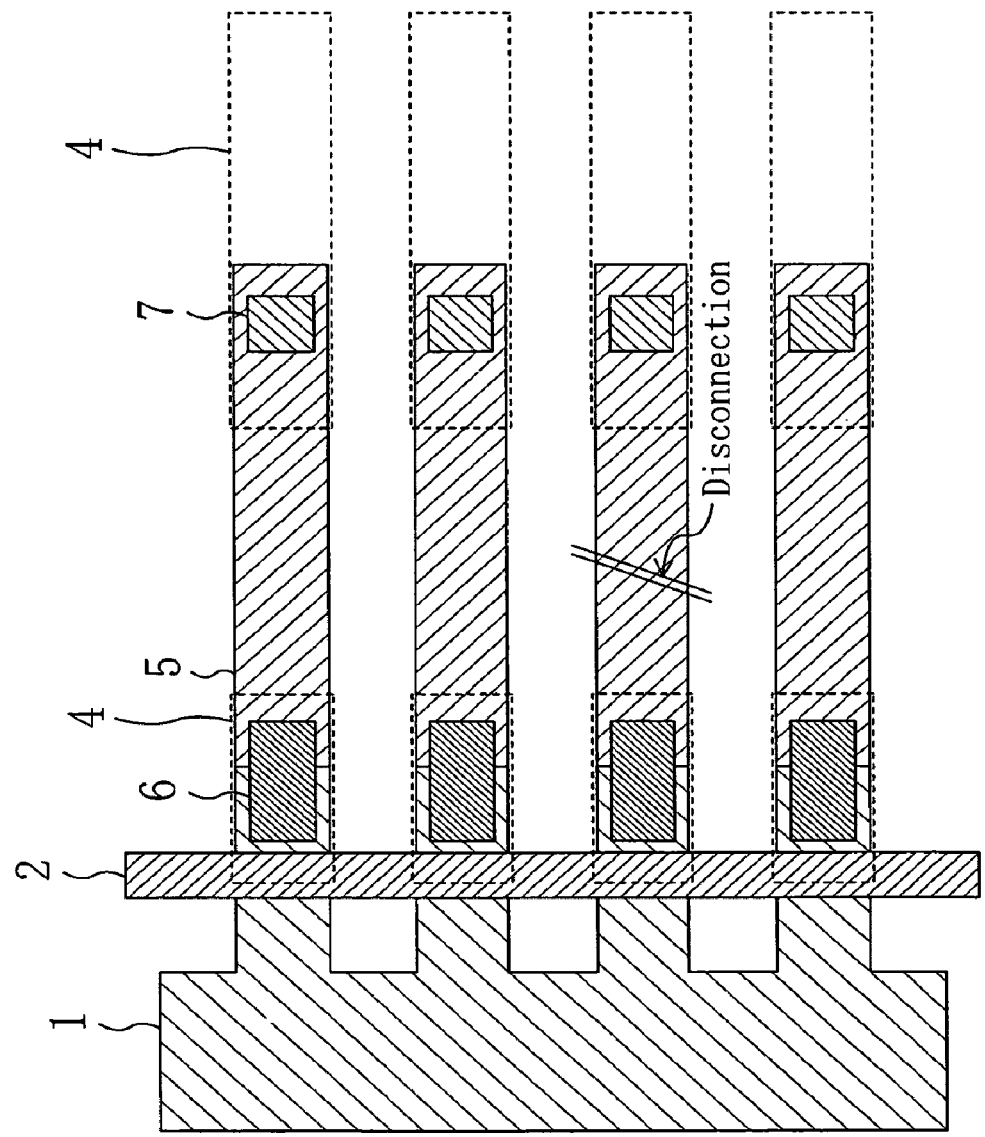
FIG. 10 is a diagram schematically showing a layout of a semiconductor element array in an electronic device according to Embodiment 7 of the present invention.

FIG. 10 schematically shows a layout of the semiconductor element array in the electronic device according to Embodiment 7.

As shown in FIG. 10, the semiconductor element array in the present embodiment includes a plurality of access transistors composed of an active region (OD) 1 to serve as a pair of a source region and a drain region and a gate electrode 2 formed on the active region 1 to serve as a word line. Wherein, the active region 1 includes a region which is electrically connected to at least one of the source region and the drain region and which the plurality of access transistors share in common. The other one of the source region and the drain region is connected to a gate wring 5 (the gate wiring 5 being not thinned, different from that in Embodiment 2) through a shared contact 6. A via contact 7 is formed on the other end part (a contact region) of the gate wring 5 so that the gate wiring 5 is electrically connected through the via contact 7 to an upper wiring 4 serving as a bit line. The surface of the gate wiring 5 is silicided.

In the present embodiment, a necessary number of one-bit configurations each composed of the aforementioned access transistor, the wiring 5 connected thereto, and the like are arranged in an array to form a memory element group (the semiconductor element array) that generates a specific identification number.

Also, in the present embodiment, using the semiconductor element array shown in FIG. 10 as one unit, a plurality of such units are arranged as shown, for example, in FIG. 9 (the respective elements shown in FIG. 9 correspond to the elements shown in FIG. 4 in Embodiment 2), likewise the case in Embodiment 6. This enables concentrated arrangement of the gate wirings 5 functioning as the memory elements within the predetermined region R.

Further, in the present embodiment, an additional step of locally heating the predetermined region R, that is, the gate wirings 5 in the semiconductor element arrays of the present embodiment is performed after a step called a second suicide RTP in a general CMOS manufacturing process. This enables increase in possibility of accidental occurrence of irregular resistance rise by disconnection of the silicided layer in the gate wring 5. Accordingly, when an access transistor is selected through a word line, the presence or absence of the resistance rise is recognized as variation in output from a corresponding bit line through the selected access transistor, resulting in detection of the presence or absence of the resistance rise by a sense amplifier. In consequence, a specific identification number can be set based on the irregular deviation in electric characteristic of the element composing the semiconductor element array in the present embodiment which is caused due to a random failure in the manufacturing process.

In the present embodiment, the irregular deviation in electric characteristic of an element which is caused due to a random failure in the manufacturing process is utilized as a specific identification number. The conventionally utilized variation in physical quantity of an identification element which corresponds to process variation is on a micro scale while the variation in electric characteristic of the element which is due to a failure is comparatively large variation, in other words, is irregular deviation. Accordingly, the specific identification number can be indicated with high reliability independent from environment where the element is situated (for example, temperature environment). Further, the specific identification number is impossible to be changed from outside naturally, and therefore, an artificially unforgeable semiconductor chip and the like applicable to IC money, IC tags, ID cars, and the like can be obtained.

The present embodiment requires an additional step of subjecting the gate wiring 5 to local thermal treatment. However, no step is necessitated which does not comply with the design rule, such as the formation of the thinned gate wiring 5a in, for example, Embodiment 2, for intentionally causing the irregular resistance rise by disconnection of the silicided layer in the gate wiring 5. Hence, a side effect derived from particle generation and the like in the process can be prevented.

It is noted that in the present embodiment, outputs from the bit lines, that is, variation in electric characteristic of the elements may be dealt with as binary (0/1) information with a predetermined threshold value set. In this case, a specific number of 2 raised to power of "an ordinal number of elements" can be generated.

In addition, in the present embodiment, a cobalt silicide layer or a nickel silicide layer may be used as the silicided layer in the gate wiring 5. For using the cobalt silicide layer, the temperature for the thermal treatment for locally heating the gate wiring 5 is preferably set within the range between 800° C. and 900° C., both inclusive. On the other hand, for using the nickel silicide layer, the temperature for the thermal treatment is preferably set within the range between 500° C. and 700° C., both inclusive.

Embodiment 8

An electronic device according to Embodiment 8 of the present invention, specifically, an electronic device having a semiconductor element array that generates a specific identification number will be described below with reference to the drawing.

Figure 11:
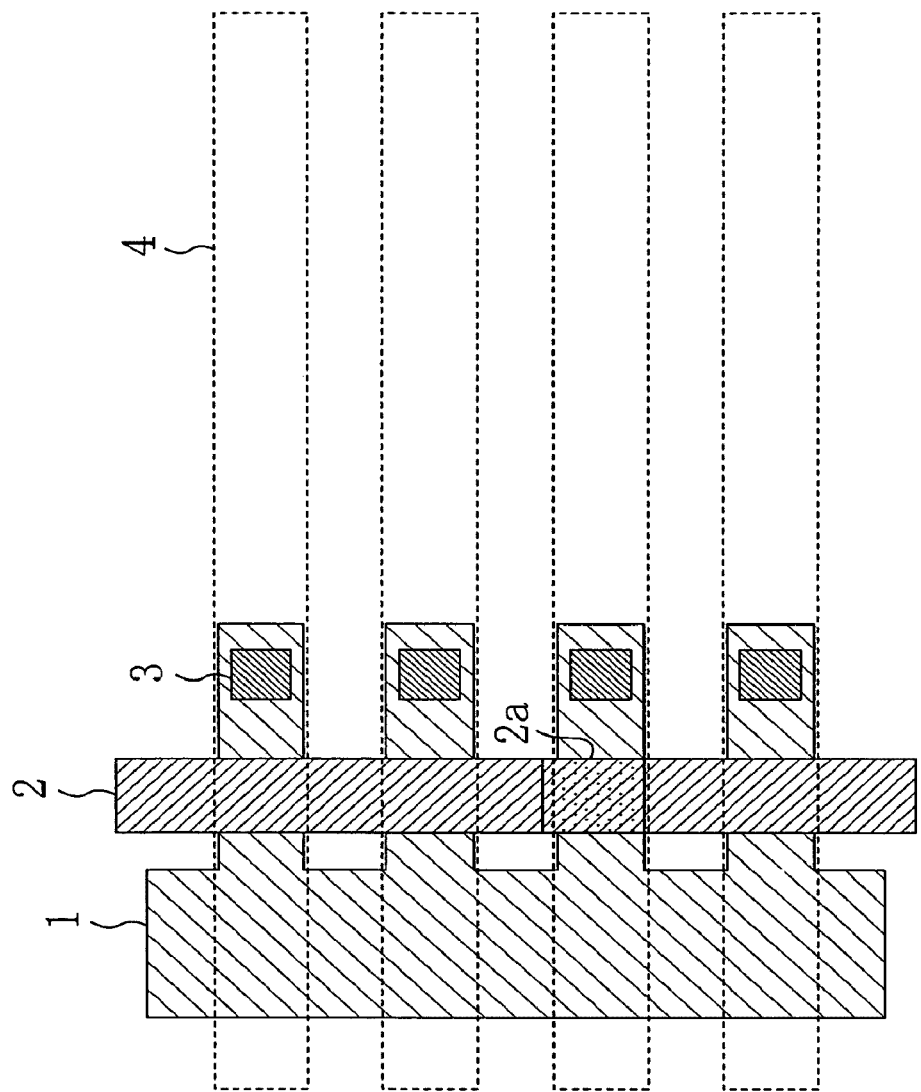
FIG. 11 is a diagram schematically showing a layout of a semiconductor element array in an electronic device according to Embodiment 8 of the present invention.

FIG. 11 schematically shows a layout of the semiconductor element array in the electronic device according to Embodiment 8.

As shown in FIG. 11, the semiconductor element array in the present embodiment includes a plurality of access transistors composed of an active region (OD) 1 to serve as a pair of a source region and a drain region and a gate electrode 2 formed on the active region 1 to serve as a word line. Wherein, the active region 1 includes a region which is connected to at least one of the source region and the drain region and which the plurality of access transistors share in common. A via contact 3 is formed on the end part (a contact region) of other one of the source region and the drain region so that the active region 1 is electrically connected through the via contact 3 to an upper wiring 4 serving as a bit line.

In the present embodiment, polysilicon is used as a material of the gate electrode 2 and the surface of the gate electrode 2 is silicided. Further, the width of the gate electrode 2 is set equal to or larger than the width determined based on the design rule, different from the case in Embodiment 4.

In the present embodiment, also, a necessary number of one-bit configurations each composed of the aforementioned access transistor, the wiring 4 connected thereto, and the like are arranged in an array to form a memory element group (the semiconductor element array) that generates a specific identification number.

Further, in the present embodiment, using the semiconductor element array shown in FIG. 11 as one unit, a plurality of such units are arranged as shown, for example, in FIG. 9 (the respective elements shown in FIG. 9 correspond to the elements shown in FIG. 4 in Embodiment 2), likewise the case in Embodiment 6. This enables concentrated arrangement of the gate electrodes 2 functioning as the memory elements within the predetermined region R.

Moreover, in the present embodiment, an additional step of locally heating the predetermined region R, that is, the gate electrodes 2 in the semiconductor element arrays of the present embodiment is performed after a step called a first silicide RTP in a genral CMOS manufacturing process. Through this heating, the polysilicon forming the gate electrode 2 exhibits excess reactivity locally, allowing a phenomenon (full silicidation) that the silicided layer reaches the gate insulating film to be caused easily. As a result, a fully silicided (FUSI) electrode 2a having a work function different from that of the other gate electrodes 2 is formed, resulting in local formation of an access transistor having a threshold value (Vt) different from that of the other access transistors.

In other words, in the present embodiment, the additional step of locally heating the gate electrode 2 is performed for increasing the possibility of accidental occurrence of irregular deviation in threshold value of the access transistor which is caused by local full silicidation of the gate electrode 2. Accordingly, when an access transistor is selected through a word line, the presence or absence of the variation in threshold value is recognized as variation in output from a corresponding bit line through the selected access transistor, resulting in detection of the presence or absence of the variation in threshold value by a sense amplifier. In consequence, a specific identification number can be set based on the irregular deviation in electric characteristic of the element composing the semiconductor element array in the present embodiment which is caused due to a random failure in the manufacturing process.

In the present embodiment, the irregular deviation in electric characteristic of an element which is caused due to a random failure in the manufacturing process is utilized as a specific identification number. The conventionally utilized variation in physical quantity of an identification element which corresponds to process variation is on a micro scale while the variation in electric characteristic of an element which is caused due to a failure is comparatively large variation, in other words, is irregular deviation. Accordingly, the specific identification number can be indicated with high reliability independent from environment where the element is situated (for example, temperature environment). Further, the specific identification number is impossible to be changed from outside naturally, and therefore, an artificially unforgeable semiconductor chip and the like applicable to IC money, IC tags, ID cars, and the like can be obtained.

The present embodiment requires an additional step of subjecting the gate electrode 2 to local thermal treatment to the general manufacturing process. However, no step is necessitated which does not comply with the design rule, such as the thinning of the gate electrode 2 in, for example, Embodiment 4, for intentionally causing the irregular resistance rise by disconnection of the silicided layer in the gate electrode 2. Hence, a side effect derived from particle generation and the like in the process can be prevented.

In addition, in the present embodiment, a cobalt silicide layer or a nickel silicide layer may be used as the silicided layer in the gate electrode 2. For using the cobalt silicide layer, the temperature for the thermal treatment for locally heating the gate electrode 2 is preferably set within the range between 500° C. and 600° C., both inclusive. On the other hand, for using the nickel silicide layer, the temperature for the thermal treatment is preferably set within the range between 300° C. and 500° C., both inclusive.

Referring to the number of the elements, appropriate number setting is a key to generation of irregular deviation in electric characteristic of an element which is caused due to a random failure in the manufacturing process of an electronic device such as a semiconductor device in view of cost reduction and area minimization of the semiconductor device. Under the circumstances, it is possible in each embodiment of the present invention that random failure occurrence rates are measured using, for example, TEG (Test Element Group) first, a specific identification number having the highest occurrence rate is obtained among the thus measured occurrence rates, a product of the highest occurrence rate and the number of manufactured semiconductor devices, that is, an expected value is obtained, and then, the number of bits for generating a specific identification number, that is, a size of the semiconductor element array is determined so that the expected value becomes sufficiently small. This attains rational and appropriate setting of the number of the elements which enables generation of a required number (kinds) of specific identification numbers.

In addition, in each embodiment of the present invention, it is preferable to generate a specific identification number in the initial stages of the semiconductor manufacturing process by setting a step of causing a random failure that causes irregular variation in electric characteristic in the former half stages (an element formation process and the like before a wiring process) of the diffusion processes (processes until wafer dicing) in the semiconductor device manufacturing process. This allows the specific identification number incapable of artificial falsification to be determined in the initial stages (in an FE (Front-end) stage) of the semiconductor manufacturing process, rather than writing of the specific identification number after the semiconductor device has been manufactured, exhibiting remarkable effects on security and on duplication prevention.

What is claimed is:

1. A method for manufacturing an electronic device which includes an element group that is composed of a plurality of elements and generates a specific identification number and of which specific identification number is set based on irregular deviation in electric characteristic of an element which is caused due to a random failure in a manufacturing process, the method comprising the steps of:
    forming, on a substrate, an access transistor electrically connected to an active region or a gate wiring, each having a silicided surface, or an access transistor including a gate electrode that is fully silicided at least locally; and
    performing local thermal treatment to a region where the active region, the gate wiring, or the gate electrode is arranged.

2. A method for manufacturing an electronic device comprising the steps of:
    (a) forming an element group which generates a specific identification number and which is composed a plurality of elements; and
    (b) setting the specific identification number based on irregular deviation in electric characteristic of the elements which is caused due to a random failure in a manufacturing process.

3. The method of claim 2,
wherein each of the elements outputs binary information as variation in electric characteristic of the element.

4. The method of claim 3, further comprising the step of:
(c) generating a specific number of 2 raised to power of "an ordinal number of elements" by the output of each of the elements.

5. The method of claim 2,
wherein each of the elements includes an access transistor.

6. The method of claim 5,
wherein each of the elements includes an active region which is connected to the access transistor electrically and which has a width smaller than a minimum width in a design rule,
a surface of the active region is silicided to form a silicided layer, and
the step (b) includes the step of setting the specific identification number based on irregular resistance rise by disconnection of the silicided layer in the active region.

7. The method of claim 5,
wherein each of the elements has a gate wiring which is connected to the access transistor electrically and which has a width smaller than a minimum width in a design rule,
a surface of the gate wiring is silicided to form a silicided layer, and
the step (b) includes the step of setting the specific identification number based on irregular resistance rise by disconnection of the silicided layer in the gate wiring.

8. The method of claim 5,
wherein on an active region of the access transistor, a contact having a diameter smaller than a minimum diameter in a design rule or a contact extending over the active region and an isolation region surrounding the active region is formed, and
the step (b) includes the step of setting the specific identification number based on irregular resistance rise by connection failure between the contact and the active region.

9. The method of claim 5,
wherein a surface of a gate electrode of the access transistor is silicided to form a silicided layer, and
the step (b) includes the step of setting the specific identification number based on irregular deviation in threshold value of the access transistor which is caused by full silicidation in the gate electrode.

10. The method of claim 5,
wherein the plurality of elements includes at least one first element having a first gate wiring which is connected to the access transistor of the first element electrically and which has a width equal to or larger than a minimum width in a design rule,
the plurality of elements includes at least one second element having a second gate wiring which is connected to the access transistor of the second element electrically and which has a width smaller than a minimum width in a design rule,
surfaces of the first gate wiring and the second gate wiring are silicided to form silicided layers,
the first gate wiring composes an electric fuse that invites disconnection of the silicided layer thereof through writing from outside,
the second gate wiring composes a physical fuse that invites disconnection of the silicided layer thereof which is caused due to a random failure, and the step (b) includes the step of setting the specific identification number based on respective states of the electrical fuse and the physical fuse.

11. The method of claim 5, wherein each of the elements includes an active region which is connected to the access transistor electrically and which has a width equal to or larger than a minimum width in a design rule, the active region is provided in a region subjected to local thermal treatment for controlling a random failure occurrence rate in the manufacturing process, a surface of the active region is silicided to form a silicide layer, and the step (b) includes the step of setting the specific identification number based on irregular resistance rise by disconnection of the silicided layer in the active region.

12. The method of claim 5, wherein each of the elements includes a gate wiring which is connected to the access transistor electrically and which has a width equal to or larger than a minimum width in a design rule, the gate wiring is provided in a region subjected to local thermal treatment for controlling a random failure occurrence rate in the manufacturing process, a surface of the gate wiring is silicided to form a silicided layer, and the step (b) includes the step of setting the specific identification number based on irregular resistance rise by disconnection of the silicided layer in the gate wiring.

13. The method of claim 5, wherein a gate electrode of the access transistor has a width equal to or larger than a minimum width in a design rule and is provided in a region subjected to local thermal treatment for controlling a random failure occurrence rate in the manufacturing process, a surface of the gate electrode is silicided to form a silicided layer, and the step (b) includes the step of setting the specific identification number based on irregular deviation in threshold value of the access transistor which is caused by full silicidation in the gate electrode.

14. The method of claim 9, wherein the silicided layer of the gate electrode is made of cobalt silicide or nickel silicide.

15. The method of claim 13, wherein the silicided layer of the gate electrode is made of cobalt silicide or nickel silicide.

* * * * *

UNITED STATES PATENT AND TRADEMARK OFFICE
CERTIFICATE OF CORRECTION

| | | |
|---|---|---|
| PATENT NO. | : 7,655,483 B2 | Page 1 of 1 |
| APPLICATION NO. | : 12/201537 | |
| DATED | : February 2, 2010 | |
| INVENTOR(S) | : Yasutoshi Okuno | |

It is certified that error appears in the above-identified patent and that said Letters Patent is hereby corrected as shown below:

On the title page, in Item "(56) References Cited", under "OTHER PUBLICATIONS", please change "KEDZIERSKY, Jakub., et al. "Threshold voltage control in NiSi-gated MOSFETs through silicidation induced impurity segregation (SIIS)." International Electron Devices Meeting 2003m Technical Digest, pp. 1-4"

to

-- KEDZIERSKI, Jakub., et al. "Threshold voltage control in NiSi-gated MOSFETs through silicidation induced impurity segregation (SIIS)." International Electron Devices Meeting 2003m Technical Digest, pp. 1-4 --.

Signed and Sealed this

Twenty-fifth Day of May, 2010

David J. Kappos
*Director of the United States Patent and Trademark Office*